US 007873946B2

(12) United States Patent
Lathrop et al.

(10) Patent No.: US 7,873,946 B2
(45) Date of Patent: Jan. 18, 2011

(54) SCALABLE VECTOR GRAPHICS, TREE AND TAB AS DRAG AND DROP OBJECTS

(75) Inventors: Arthur Lathrop, Pasadena, CA (US); Venkat Chellasamy, Chino, CA (US)

(73) Assignee: Oracle America, Inc., Redwood City, CA (US)

( * ) Notice: Subject to any disclaimer, the term of this patent is extended or adjusted under 35 U.S.C. 154(b) by 1334 days.

(21) Appl. No.: 11/389,439

(22) Filed: Mar. 23, 2006

(65) Prior Publication Data

US 2007/0242082 A1    Oct. 18, 2007

(51) Int. Cl.
G06F 9/44    (2006.01)

(52) U.S. Cl. .................. 717/125; 717/105; 717/106; 717/109; 717/113; 715/204; 715/700

(58) Field of Classification Search .................. 717/105, 717/102, 109
See application file for complete search history.

(56) References Cited

U.S. PATENT DOCUMENTS

| | | | | |
|---|---|---|---|---|
| 5,862,325 A * | 1/1999 | Reed et al. | ................... | 709/201 |
| 5,909,548 A * | 6/1999 | Klein et al. | ................... | 709/217 |
| 6,088,717 A * | 7/2000 | Reed et al. | ................... | 709/201 |
| 6,151,624 A * | 11/2000 | Teare et al. | ................... | 709/217 |
| 6,256,627 B1 * | 7/2001 | Beattie et al. | ................... | 1/1 |
| 6,278,448 B1 * | 8/2001 | Brown et al. | ................... | 715/866 |
| 6,311,194 B1 * | 10/2001 | Sheth et al. | ................... | 715/236 |
| 6,732,331 B1 * | 5/2004 | Alexander | ................... | 715/234 |
| 6,829,780 B2 * | 12/2004 | Kraft et al. | ................... | 725/42 |
| 6,924,827 B1 * | 8/2005 | Gulati et al. | ................... | 715/763 |
| 6,938,170 B1 * | 8/2005 | Kraft et al. | ................... | 726/23 |
| 6,954,611 B2 * | 10/2005 | Hashimoto et al. | ......... | 455/3.01 |
| 7,117,256 B1 * | 10/2006 | Blinn | ................... | 709/219 |
| 7,373,382 B2 * | 5/2008 | Nakai et al. | ................... | 709/206 |
| 7,379,965 B2 * | 5/2008 | Sherwood et al. | ........... | 709/203 |
| 7,487,513 B1 * | 2/2009 | Savchenko et al. | .......... | 719/320 |
| 7,493,397 B1 * | 2/2009 | Guthrie et al. | ............. | 709/227 |
| 7,630,986 B1 * | 12/2009 | Herz et al. | ................... | 1/1 |
| 7,675,520 B2 * | 3/2010 | Gee et al. | ................... | 345/473 |
| 7,705,858 B2 * | 4/2010 | Ubillos et al. | ............... | 345/619 |

(Continued)

OTHER PUBLICATIONS

Title: Visualizing optimization algorithms via rapid prototyping of graphical user interfaces, author: J. F Beetem, source: IEEE, dated: Jun. 23, 1992.*

(Continued)

*Primary Examiner*—Chameli C Das
(74) *Attorney, Agent, or Firm*—Osha • Liang LLP

(57) ABSTRACT

A mechanism is disclosed for providing Scalable Vector Graphics (SVG) images, Tree and Tab as drag and drop objects. A page design tool receives an indication that a user wishes to place a metadata-defined image onto a page design canvas. The page design tool further receives an association of metadata defining the image, and in response, parses through the metadata to identify properties and characteristics of the metadata-defined image to expose to a user through a graphical user-interface of the page design tool. The page design tool enables a user to assign conditions to the exposed properties and characteristics of the image, as well as map available data sources to the properties and characteristics in order to dynamically control image properties during display. Hence, the page design tool presents graphical user interface tools for simply incorporating otherwise complex objects into page designs.

21 Claims, 10 Drawing Sheets

U.S. PATENT DOCUMENTS

| | | | |
|---|---|---|---|
| 7,716,630 B2* | 5/2010 | Wholey et al. | 717/100 |
| 2002/0184610 A1* | 12/2002 | Chong et al. | 717/109 |
| 2003/0172368 A1* | 9/2003 | Alumbaugh et al. | 717/106 |
| 2005/0149557 A1* | 7/2005 | Moriya et al. | 707/104.1 |
| 2006/0004914 A1* | 1/2006 | Kelly et al. | 709/219 |
| 2006/0036710 A1* | 2/2006 | Kaneko et al. | 709/217 |
| 2006/0245644 A1* | 11/2006 | Whitman | 382/167 |
| 2007/0180066 A1* | 8/2007 | Sherwood et al. | 709/220 |
| 2007/0216712 A1* | 9/2007 | Louch | 345/660 |
| 2007/0233872 A1* | 10/2007 | Yoshikawa et al. | 709/226 |
| 2009/0300578 A1* | 12/2009 | Neil | 717/104 |

OTHER PUBLICATIONS

Title: A GUI environment to manipulate FSMs for testing GUI-based applications in Java, author: Chen et al, source: IEEE, dated: Jan. 2, 2001.*

* cited by examiner

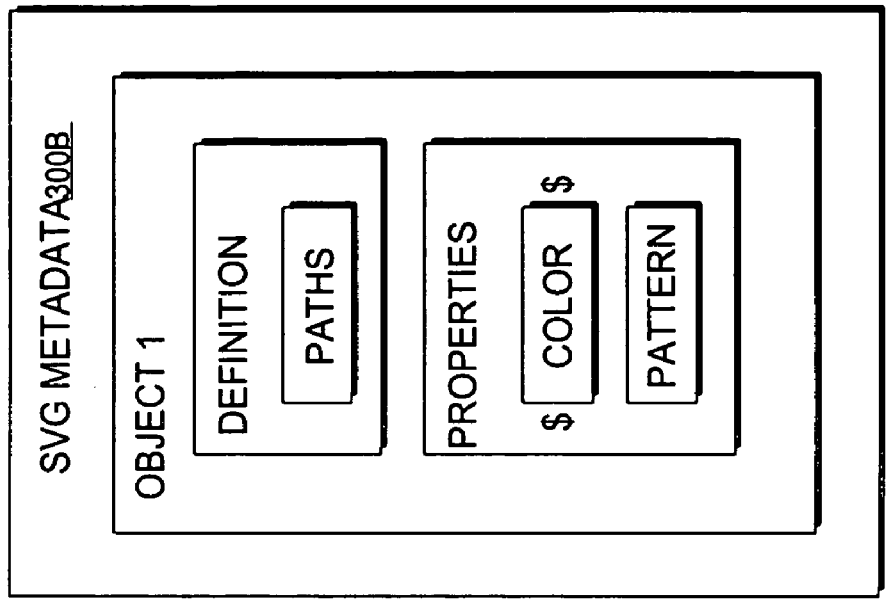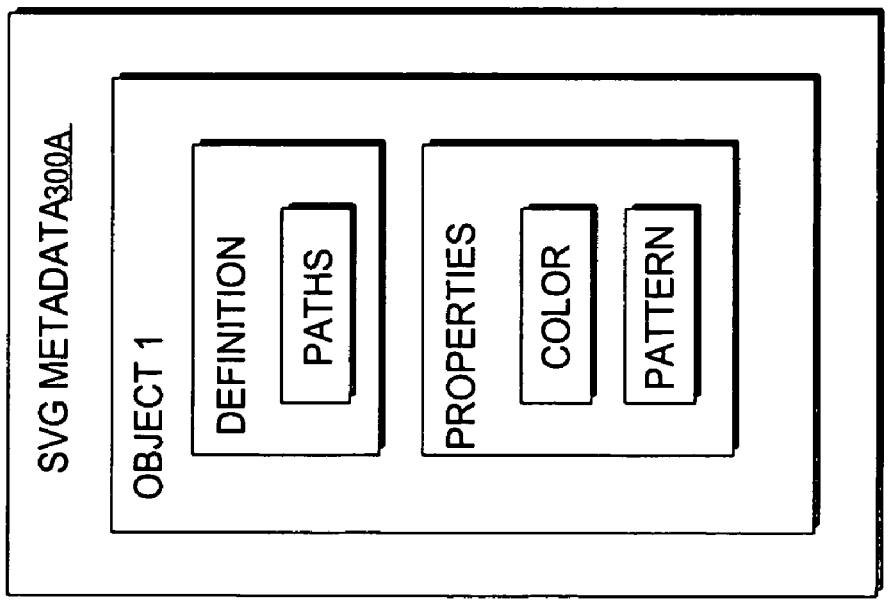
Fig. 3

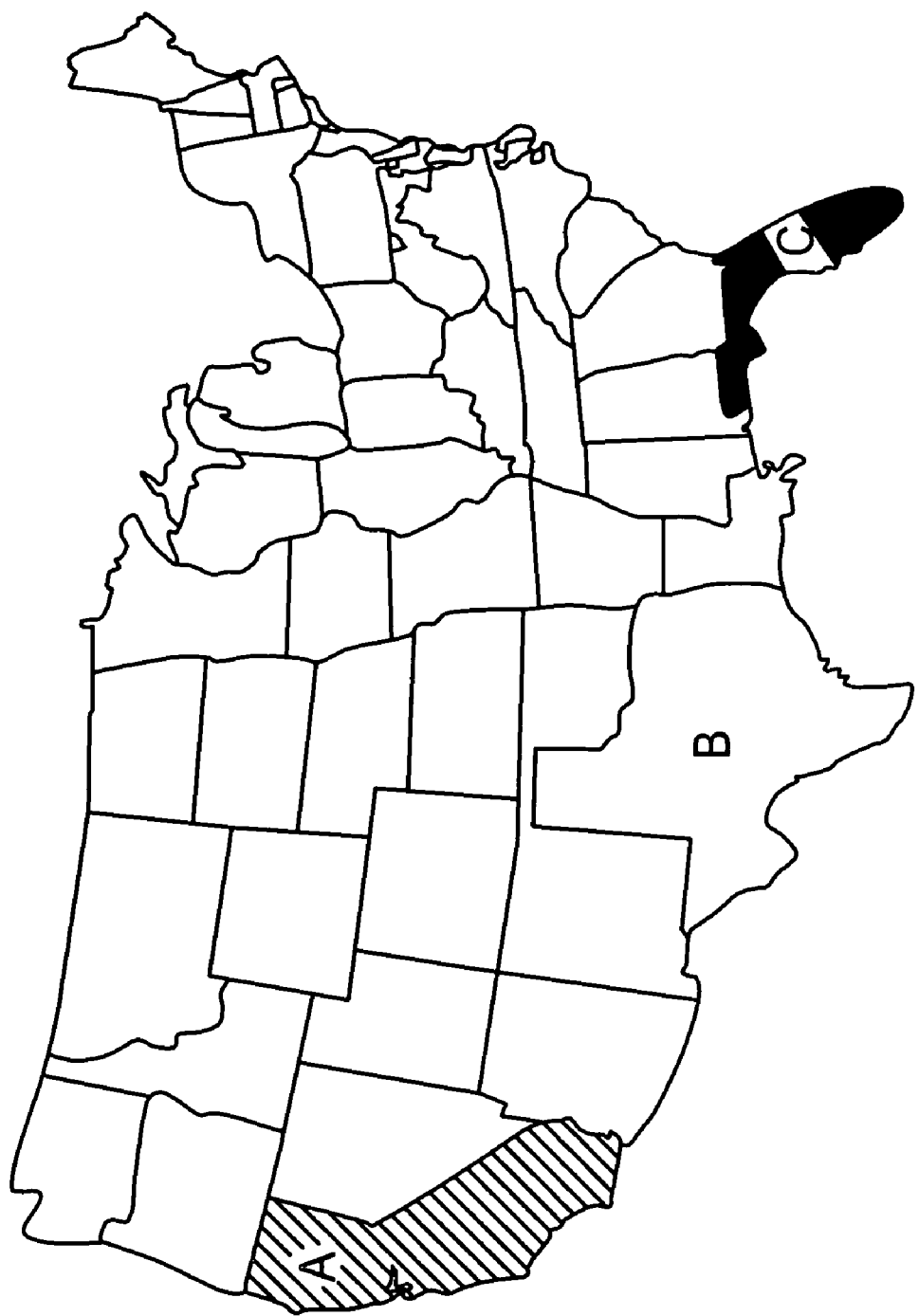

SCALABLE VECTOR GRAPHICS, TREE AND TAB AS DRAG AND DROP OBJECTS

RELATED APPLICATION(S)

This application is generally related to U.S. patent application Ser. No. 11/250,749, entitled "'If' and 'Switch' as Drag and Drop Objects," by Jerry A. Waldorf, filed Oct. 15, 2005, the contents of which are incorporated in their entirety herein by reference.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional applications have presented user-interfaces for users to interact with and control application functions. These applications were conventionally installed on user owned computer systems. Recently, however, developments in technology have allowed enterprises to deploy such applications via the Internet, World Wide Web ("Web") or a Local Area Network ("LAN"). These applications, more commonly known as Web applications, are easily accessed and controlled by end-users through the use of a web-browser or other GUI program on the user's computer system which is connected to the Internet or LAN. Such web applications are advantageous in that they do not require each end-user to install the application locally on a computer system. Instead, the application may be accessed remotely through the Internet or LAN, thus saving system resources on the user's local computer system.

In order to deploy web applications, much time and effort is spent on developing graphical display pages for user-interaction. Further, much time and effort must also be spent in tying the display pages to back-end systems such as databases engines. Such display pages of a web application are currently designed using conventional page design tools. Conventional page design tools allow users to design the structure and layout of web pages. However, one drawback of conventional page design tools is their limited flexibility in constructing complex web application elements without requiring much time and effort from a web page designer. For instance, certain complex components, such as dynamic forms and images, cannot be easily created without having a page designer manually write code representing the component. The process of writing and testing the code is usually complex and tedious, and further takes up much valuable resources and time.

Further, the problem is intensified where dynamic objects are integrated with back-end systems as usually requested in web applications. For instance, a page designer utilizing conventional page design tools must also have extensive knowledge of the back-end systems that will be used in the web application. Thus, not only would a page designer need to know how to create and test code representing complex objects, he/she would also need to have extensive knowledge of the back-end system and manually enter and test the complex object code. This process is prone to error and requires that the user have extensive knowledge of back-end systems.

From the above discussion, it is clear that conventional page design tools do not provide adequate results. Thus, an improved mechanism for designing display pages containing complex web application objects is needed.

SUMMARY

In accordance with one embodiment of the present invention, there is provided a method for providing Scalable Vector Graphics, Tree and Tab as drag and drop objects. Scalable Vector Graphics (SVG) is a standard for representing metadata-defined images, which may be incorporated into display pages of a web application. Conventionally, metadata-defined images are incorporated into web pages by manually inserting the image metadata into the code representing the display page.

However, according to an embodiment of the invention, what is provided is a page design tool that allows for the simple incorporation of SVG images into display pages using graphical user interface (GUI) tools. For instance, using the page design tool, metadata-defined images such as SVG images may be incorporated into page designs using drag and drop techniques. Because the page design tools allows for such incorporation, a user need not have extensive programming knowledge to develop complex objects for display on a web application page.

The page design tool provides pre-built code representing "objects" for incorporating metadata-defined images into a page design. When a user would like to incorporate a metadata-defined image into a page design, the user may place an object representing a metadata-defined image onto the design canvas using drag and drop techniques. In response, the page design tool receives an indication that a user is requesting that the metadata-defined image be part of the page design. When the object is placed onto the canvas, the user associates the object with metadata defining the image, such as SVG image metadata.

The metadata defining an SVG image contains a structured set of elements defining properties and characteristics of the SVG image. Further, the metadata is written in a user-friendly language, allowing a user to easily access and edit the properties and characteristics of an image. By accessing the metadata, a user may specify properties and characteristics of the SVG image to expose within the page design tool.

After a user has associated the image metadata with the object, the page design tool parses through the selected image metadata to determine which properties and characteristics of the image to expose to the user. Further, the page design tool enables the user to specify conditions for image properties and characteristics that have been exposed to the user. When a condition is specified for a particular property or characteristics, the condition is applied to adjust a value for that property or characteristic when the metadata-defined image is being displayed to an end-user viewing the display page of the web application.

Additionally, the page design tool also allows the user to map data sources to exposed image properties and characteristics. These data sources provide the data that is used to determine if the conditions have been satisfied, and may be extracted from page flow data representing data flow between pages and components of the web application. The page design tool provides simple incorporation of such data sources by presenting a graphical representation of available data sources to the user. In order to associate a data source with a property, a user may simply click and drag the graphical representation of the data source into the graphical representation of the property or condition. In this manner, a user need not have extensive knowledge of back-end systems or programming expertise. Instead, the user may simply use drag and drop techniques to create complex objects of a web application, including dynamic metadata defined images.

When the page design and the page are completed, the page design tool provides code which represents the display pages to a display engine. The display engine receives the display page code, as well as data representing the page flow for the web application and processes the code according to user-interaction. For instance, the display engine determines which pages of the web application to display to users, and additionally, determines whether any conditions have been satisfies for the display of metadata defined images. In order to determine whether any conditions have been satisfied, the display engine retrieves data from the specified data sources, analyzes the data to determine whether the conditions have been satisfied and causes property values of a metadata-defined image to change during display of the images.

Hence, the page design tool allows for the simple incorporation of otherwise complex objects into display pages of a web application. Instead of requiring a user to have an extensive knowledge of programming language and back-end system design, the page design tool presents complex objects in a graphical user interface, allowing a user with minimal programming experience to incorporate complex objects such as SVG images, Tree and Tab objects into web application display pages.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram depicting SVG image metadata according to one embodiment of the present invention;

FIG. 7B is a diagram illustrating a dynamically updated SVG Image according to on embodiment of the present invention.

DETAILED DESCRIPTION OF EMBODIMENT(S)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Structural Overview

Figure 1:
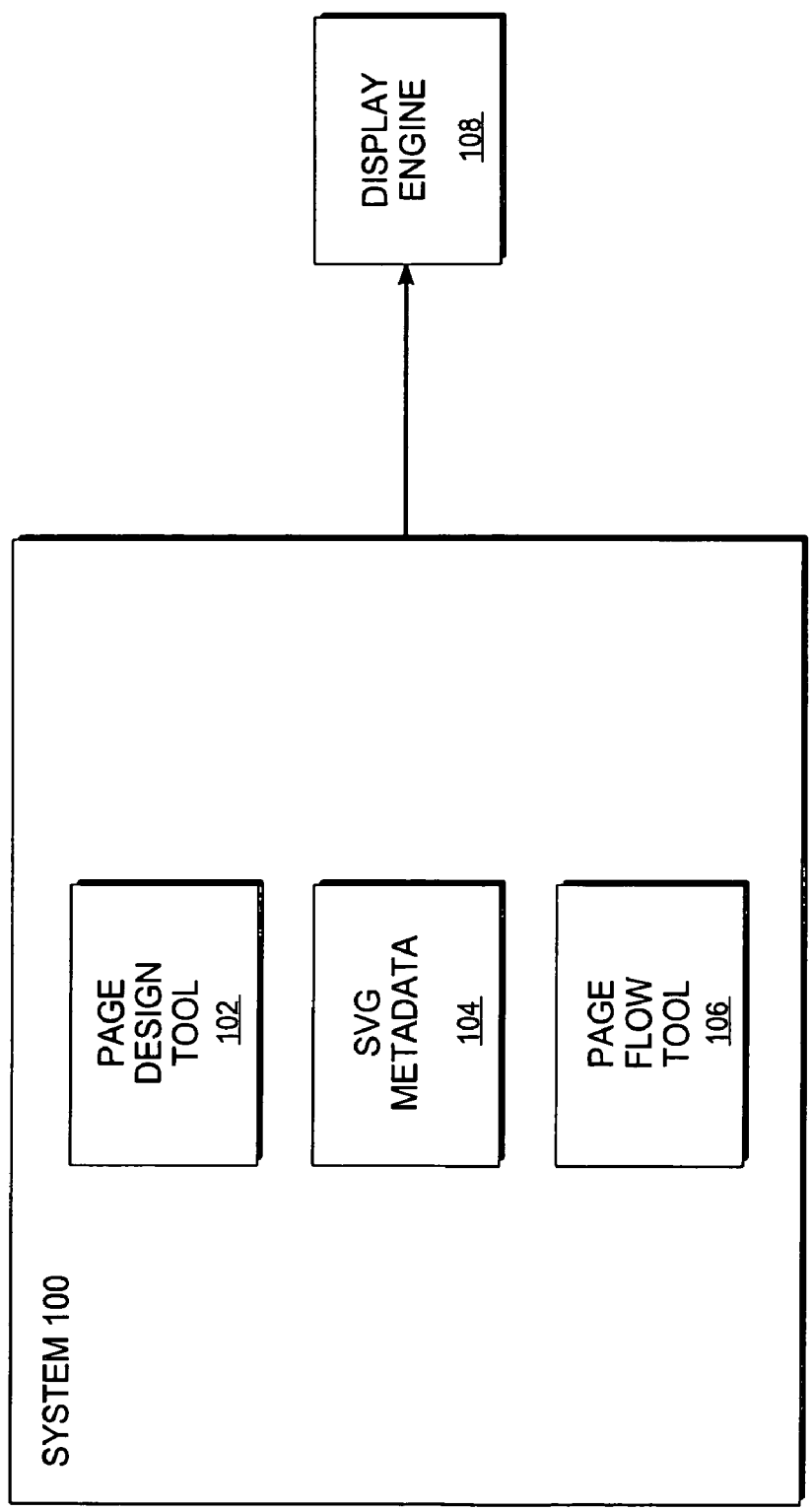
FIG. 1 is a block diagram representing an overview of a system in which one embodiment of the present invention may be implemented.

Referring now to FIG. 1, there is shown a block diagram of a System 100 in which one embodiment of the present invention may be implemented. System 100 includes a Page Design Tool 102, SVG Metadata 104 and Page Flow Tool 106. Further, FIG. 1 includes Display Engine 108. Note that while Display Engine 108 is depicted as a component separate from System 100, in other embodiments, Display Engine 108 may be part of System 100. Further, any component of System 100 may be located on a separate system, and may communicate with any other component of System 100 or the Display Engine 108 through any proper communications means, such as an Ethernet interface connecting to the Internet or a LAN via an Ethernet cable.

Together, the components of System 100 provide the ability for a user to create graphical user interface (GUI) pages that are part of an application. According to one embodiment, the application is a web application that employs web services and the Web Services Definition Language (WSDL). WSDL defines the public interface for a web service or application. A client, such as a web application, connecting to a web service can read and interpret the WSDL to determine what functions and/or data are available for use within the web application. Alternatively, the components of System 100 may be used for any other purpose, such as designing web pages for a web site.

The Page Design Tool 102 allows a user to design graphical user interface pages that will be displayed to a user of the web application. Further, the page design tool may be used to create end user business interfaces to overlay composite applications and workflow management. Note that although reference is made to a web application throughout the description of the invention, the invention is not limited to such an embodiment, and is also applicable to designing conventional web pages of a web site or any other graphical user interface page.

The Page Design Tool 102 provides a GUI environment for creating display pages. In order to design pages, a user may simply arrange and organize graphical elements on a design canvas of the Page Design Tool 102. The Page Design Tool 102 provides pre-built code and graphical interface tools for creating and organizing otherwise complex objects in a simple GUI environment. Thus, the Page Design Tool 102 allows a user to create complex and dynamic objects for display without requiring the user to manually code the object or have extensive knowledge of back-end systems. More specifically, a user may use the Page Design Tool 102 to specify details for individual web pages in an application, using, for example, drag-and drop techniques to place GUI components and objects onto a design canvas. These GUI components are pre-built web design elements such as check boxes, text boxes, drop-down menu lists, graphics containers and submit buttons.

Further, the Page Design tool 102 additionally enables a user to view and modify properties and characteristics for the pre-built components or objects. For instance, in one embodiment, the object on the canvas may be a text object, and the properties information may specify the text color. The page design tool allows the user to change the text color by modifying the properties information for that object.

According to one embodiment, the Page Design Tool 102 provides a Scalable Vector Graphic (SVG) Object as a GUI component for use on the design canvas. In general, an SVG Object allows for a user to import an SVG Image onto the design canvas. An SVG Image is an image defined by metadata and constructed according to standard SVG specifications as defined by the World Wide Web Consortium (W3C). According to one embodiment, an SVG image is an image defined by metadata in a format known as the Extensible Markup Language ("XML"). Put differently, SVG represents a language for describing two-dimensional graphics in XML, wherein the XML data as a whole defines the image. Web browsers having the ability to display SVG graphics interpret the XML or metadata representing the image in order to display the image on a display page. Note, however, that the invention is not limited to SVG images, but involves any image defined by any type of metadata.

The advantages of utilizing SVG graphics in a display page include the ability to easily change the metadata which defines the image. Further, the metadata representing the images are defined by a platform-independent standard, such as XML. Because the metadata is platform-independent, the SVG image metadata may be easily integrated and displayed across many platforms.

According to one embodiment, the SVG object of the Page Design Tool 102 acts a placeholder for an SVG image on the design canvas. Specifically, the SVG Object is pre-configured to allow a user to import an SVG Image into the page. When the user associates metadata defining an SVG Image with the SVG Object, the SVG Object parses through the SVG Image metadata in order to process and display the associated image. Hence, rather than displaying the metadata representing the SVG Image on the design canvas, the SVG Object allows the actual SVG Image to be displayed. Further, the SVG Object parses through the SVG Image metadata in order to determine which elements or properties of the SVG image to expose to the user.

Once a user has completed designing a page, the Page Design Tool 102 automatically generates the code representing the page that will be displayed in a web application. The display page code may be in a form known as the Web Services Definition Language (WSDL), the HyperText Markup Language (HTML) or in the JAVA programming language as JavaServerPage (JSP) code. Thus, as opposed to requiring a user to manually write the HTML, WSDL or JAVA code, the Page Design Tool 102 allows a user to design pages using a GUI environment and incorporate objects such as SVG Images and other metadata-defined objects onto the design canvas with relative ease. Once the page design process is complete, the display code is provided, along with other data for the web application, to a Display Engine 108 for processing and display to end-users. Note that while WSDL, HTML and JSP have been identified as types of code languages for display pages, the invention is not limited to such an embodiment, and any type of language may be used to create the display pages.

Another tool in System 100 is the Page Flow Tool 106. The Page Flow Tool 106 is used to structure the order and display of pages in a web application. For instance, the Page Flow Tool 106 can facilitate the flow of web-based business activities and manages pages within a web application. Further, the Page Flow Tool 106 enables page flow modeling, monitoring, execution, as well as an analysis of how data messages flow from page to page. Thus, the Page Flow Tool 106 allows a user to structure a workflow of a web application by creating a high-level page-by-page flow that web users may follow through to complete a task.

According to one embodiment, the Page Flow Tool 106 and the Page Design Tool 102 interact with each other to supply the user with a complete overview of the web application architecture. For instance, in order to design a web application, a user may first design the interactions, page flow, and operations of the web application using the Page Flow Tool 106. Next, using the Page Design Tool 102, the user may begin to design the individual display pages that will be displayed to end-users using the web application. While designing such pages, the Page Design Tool 102 may process and interpret the page flow data from the Page Flow Tool 106 in order to provide the user with relevant page flow information. The user may use the page flow information to assign conditions and data sources to the properties of objects on the design canvas.

When the web application is ready for deployment, the Display Engine 108 causes pages of the web application to display and passes data according to the page flow between pages of the web application. The Display Engine 108 operates in conjunction with back-end systems such as databases and application servers to provide and display the composite application to the end-user, as well as interact with the end-user.

More specifically, according to one embodiment the Display Engine 108 operates in conjunction with a page flow engine modeled after the page flow designed with the Page Flow Tool 106. The page flow system can orchestrate system responses to an execution of web page component code. At run time, the page flow engine executes page links, receives and processes user input, and based on human interaction, moves a viewer from page to page until an underlying process of the application is complete. What is shown to the user at each page in the application depends on what has been designed or created using the Page Design Tool 102.

The Display Engine 108 is responsible for interacting with the components of System 100 to cause the display of pages to end-users. For instance, both the Page Design Tool 102 and the Page Flow Tool 108 generate instructions in the form of code and communicate these instructions to the Display Engine 108. The Display Engine 108 processes the instructions and causes the display of pages within the application as designed by a user using System 100.

When page design and page flow design is complete through use of the Page Design Tool 102 and Page Flow Tool 106, data representing the composite application is then submitted to the Display Engine 108.

Figure 2:
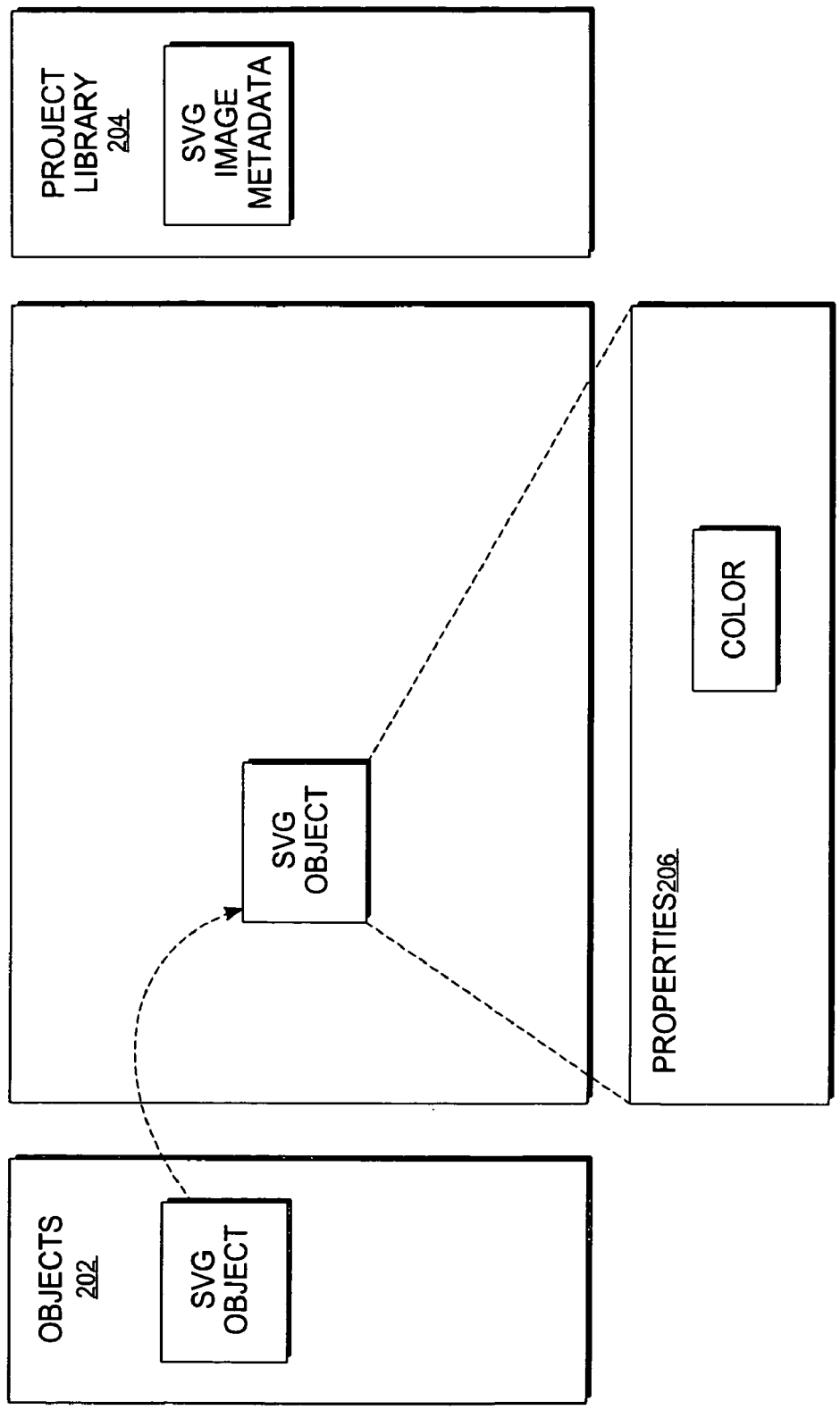
FIG. 2 is a block diagram depicting a graphical user interface page design tool according to one embodiment of the present invention.

Referring now to FIG. 2, a block diagram depicting a GUI of the Page Design Tool 102 is shown according to one embodiment. The Page Design Tool 102 includes Canvas 200, an Objects selection area 202, a Project Library area 204 and a Properties dialog box 206. The Canvas 200 represents the design area of a particular page. Using Canvas 200, a user may place and organize different GUI objects and components to design a page for display to end-users. According to one embodiment, a user selects GUI objects and components from the Objects selection area 202. In order to place an object onto Canvas 200, a user may simply "drag" the object from the Objects selection area 202 and "drop" the object onto the Canvas 200 in the desired location. Such a technique is more commonly known as a "drag-and-drop" technique.

The objects selection area 202 may contain a number of different object types for use on Canvas 200. For instance, particular objects may include image based objects, text based objects, and form objects. Other objects that may be placed on Canvas 200 are further described in detail in U.S. patent application Ser. No. 11/250,749, entitled "'If' and 'Switch' as Drag and Drop Objects", by Jerry A. Waldorf, filed on Oct. 15, 2005. According to one embodiment, the objects of the Objects selection area 202 may be pre-built combinations of JAVA classes and JavaServerPages ("JSP") code representing web interface elements. The GUI components may be selected and moved to a particular position within the page layout Canvas 200 during the development of a web page using drag and drop techniques.

According to one embodiment, the Objects Selection area 202 also includes an SVG Object for incorporating SVG Images onto Canvas 200. The SVG Object is a pre-built component which contains code for receiving and modifying SVG image metadata. For instance, when the user drags the SVG Object onto the Canvas 200, a dialog may appear requesting that the user designate SVG Image metadata to import into the SVG Object. The SVG Object parses through the SVG Image metadata, displays the SVG Image on Canvas 200 and exposes image properties to the user using the Properties dialog box 206.

When a user would like to incorporate an SVG image onto a display page, the user places the graphical representation of the SVG Object onto the design Canvas 200. Next, the user associates SVG metadata with the SVG Object. The SVG metadata defines the SVG Image that the user would like to be displayed. As described above, the SVG Metadata contains information defining the particular paths and characteristics for an image.

In order to associate SVG Image Metadata with an SVG Object, a user may browse the Project Library area 204. The Project Library area 204 displays the contents of the current project library, which may be a directory on System 100 containing files and other resources for creating web application pages. Thus, the Project Library area 204 may display a listing of files for use by a user, including any images or objects for display on the page. According to one embodiment, the Project Library area 204 identifies SVG Image Metadata which defines an SVG image that the user would like to incorporate onto the display page. The user selects the SVG Image Metadata by selecting it from the Project Library area 204. Alternatively, the user may employ drag and drop techniques to associate the SVG Image Metadata with the SVG Object on the Canvas 200.

Once the user has selected the appropriate SVG Image Metadata, and when the SVG Object parses through the SVG Image Metadata, a user may use the Properties dialog box 206 to view and modify properties of the SVG Image. The Properties dialog box 206 contains information relating to an object that is currently selected by the user. The Properties dialog box 206 displays properties and characteristics that may change depending on the selected object. For example, each pre-built object of the Page Design Tool 102 may contain a different set of properties available for the user to modify. Further, the Properties dialog box 206 is also functional for allowing a user to assign conditions to properties and for mapping data sources to the properties.

According to one embodiment, the Properties dialog box 206 also includes information identifying incoming or available data sources for the page. For instance, the properties dialog box may identify incoming data sources by examining page flow data. A user may assign a particular data source to a property and further specify conditions for that property such that during display of the image, the Display Engine 108 will process data from the data source and determine whether the property of the image should be changed before display.

Functional Overview

As mentioned earlier, SVG images are defined by SVG metadata. Although particular reference is made to SVG images and SVG metadata, the invention is not limited to such an embodiment, and any metadata-defined image may be substituted according to the process as further described herein. The SVG metadata defines the attributes and characteristics of the SVG image. When an application such as a web browser is instructed to display an SVG image, the browser interprets the SVG metadata, determines the properties and characteristics of the SVG image to display and causes the SVG image to be displayed. According to one embodiment, SVG images are created outside of the Page Design Tool 102 and are defined by SVG metadata files which have been previously created or provided by a user. In order to expose particular properties of the SVG image inside the Page Design Tool 102, the SVG metadata file may be accessed to identify the particular properties.

a. Processing SVG Metadata

Referring now to FIG. 3, a block diagram illustrating SVG metadata is shown in accordance with one embodiment. SVG Metadata 300A includes a set of organized elements and sub-elements which may be edited and manipulated by a user. A user may edit the SVG metadata by using a text editor or any other application capable of allowing a user to edit metadata. The organized nature of SVG metadata enables a user to edit particular portions of an SVG image easily without extensive programming knowledge.

The SVG metadata 300A may define a number of objects. Each object of the SVG metadata 300A may contain its own properties and characteristics for display. When displayed together, all the objects of the SVG metadata together form the SVG Image that is to be displayed. According to one embodiment, the SVG Metadata 300A is presented according to a layers, such that objects listed at the top of the SVG Metadata will appear "on top" of any objects listed below it. As such, the SVG Metadata may define object layers, as well as object transparencies and priority through its hierarchical organization of object elements.

One object in SVG Metadata 300A is OBJECT 1. OBJECT 1 includes its own attributes and characteristics as defined in the sub-elements DEFINITION and PROPERTIES. Of course, other objects of SVG Metadata 300A may contain any number of sub-elements required to define an SVG image. In OBJECT 1, the DEFINITION element includes PATHS data. According to one embodiment, the PATHS data identifies line paths which define the boundaries or lines of an SVG image. For instance, the paths data may define a number of point-to-point paths, which when displayed together, may define the boundaries of a polygon, circle, or other complex shapes which may be defines by a number of paths. In summary, the PATHS data may define any type of boundary, including non-linear ones, through the use of multiple paths, endpoints and line types.

The PROPERTIES element may include data defining properties for the particular object, OBJECT 1, of the SVG image. According to one embodiment, two properties of the present OBJECT 1 include the COLOR and PATTERN of the object. The COLOR property may represent the fill color of the defined objects, as well as the color of any lines defining the boundary of the object. The PATTERN of the object may include any display patterns to be displayed within the fill color of the object. For instance, example patterns may define a striped pattern, a checkered pattern or any other pattern that may be displayed within the object.

Note that although reference has been made to particular properties and characteristics within the SVG metadata, the invention is not so limited, and the SVG Metadata may define any number of image properties and characteristics for any number of objects.

When a user would like to expose particular properties of the SVG image within the Page Design Tool 102 for, the user may edit the SVG Metadata to indicate that the particular property should be exposed.

For instance, suppose that a user would like to expose the color property of a particular SVG image within the Page Design Tool. Using a program capable of editing metadata such as a text editor, a user may indicate which property to select by placing an indicator around the COLOR element. According to SVG Metadata 300B, the indicator is a "$" character placed before and after the contents of the COLOR element. Note, however, that in other embodiments, any method for indication may be used.

Thus, when the SVG Object is invoked to parse through the SVG Metadata 300B, the SVG Object will recognize which properties to expose by looking for the appropriate indicator, in this case any element surrounded by the "$" character. Once found, the SVG Object will cause the particular property to be displayed to a user of the Page Design Tool 102. Using the Page Design Tool 102, a user may manipulate the properties of the SVG Object as further described herein. In another embodiment, the SVG Object may, by default, choose to expose all elements of the SVG Metadata. In this case, a user may edit the SVG Metadata to hide a particular element or property from being exposed in the Page Design Tool 102 by placing an indicator around the desired element. Further, in other embodiments, the SVG Object may parse through the SVG Metadata and automatically determine which elements to expose.

Once a user has completed editing the SVG Metadata defining the SVG Image, the SVG Image is ready for incorporation into the Page Design Tool 102.

b. Incorporating Page Flow Data

As described above, a user designing a particular display page of a web application uses the Page Design Tool 102 to design the page. However, in order to define the placement of the page within the application, including the flow of pages and data within the application, the user utilizes the Page Flow Tool 106. The Page Flow Tool 106 allows the user to structure the data flow and organization of an application using a GUI environment.

Figure 4:
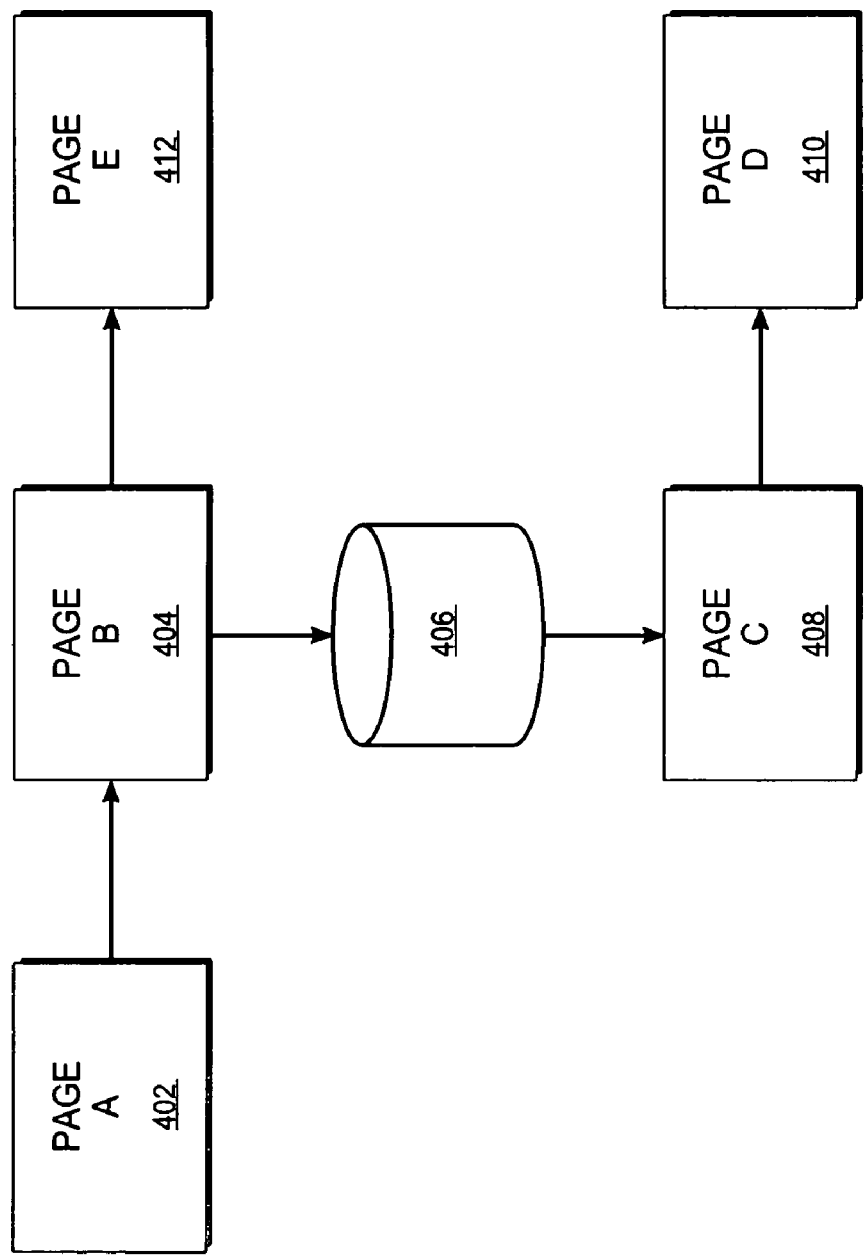
FIG. 4 is a block diagram depicting an overview of a page flow diagram according to one embodiment of the present invention.

Referring now to FIG. 4, a block diagram depicting a page flow of an application is shown according to one embodiment. The page flow includes nodes representing particular display pages or back-end operations within an application. For instance, Page A at node 402 represents the first page that is displayed to a user using the application. From Page A, an end-user is taken to node 404 representing Page B. According to the page flow, it is apparent that node 404 may receive any data that has come from node 402. Thus, for instance, Page A may have requested that a user enter in particular information, such as a username. The username may then be passed to Page B at node 404.

Page B represents a fork within the page flow. For instance, depending on the results of Page B, the page flow might navigate to Page C at node 408 or Page E at node 412. For instance, assume Page B represented a user-authentication page within a web application. If the authentication was successful, the page flow will navigate to Page C at node 408. Otherwise, the page flow will navigate to Page E at node 412. Page E may display an error message or a message requesting that the user register with the web application. Hence, because Page B represents a fork, the navigation of the page flow depends upon the results of end-user interaction.

Node 406 represents a back-end data operation. A back-end operation may be an operation which is not visible to the user, and thus, a display page is not presented to the end-user. According to one embodiment, such a back-end operation may be the processing of data or the querying of a database. For instance, assume that Page B requested that the user enter in certain financial information in order to obtain a credit score. At node 404, the user enters in the requested financial information and requests that their credit score be displayed. This financial information is then passed to node 406, where a data operation takes place on the user's financial data to create data representing the user's credit score. When the data operation is complete at node 406, the data representing credit score is available for Page C at node 408. Therefore, because data is passed from node 406 to node 408, node 406 carries at least one data source for node 408. Put differently, any data emerging from node 406 may be processed and/or displayed on Page C to a user.

Further, assume that on Page C (node 408), a designer has configured a dynamic image to display to a user. The dynamic image is configured to either display the color red, yellow or green based on the calculated credit score of the user. As described earlier, the credit score is calculated at node 406 by processing data from node 404. Thus, at node 408, the dynamic image is presented to the user on Page C with the correct color according to the user's credit score retrieved from node 406.

According to one embodiment, the component responsible for retrieving the data, assessing whether conditions has been satisfied and causing the dynamic image to change is the Display Engine 108. The Display Engine 108 thus retrieves the credit score data from node 406 and determines whether the credit score has met any of the conditional thresholds set for each color. After determining which color to use, Display Engine 108 causes the dynamic image to display with the correct color on Page C according to the process as further described herein. The conditional property of an image on Page C may be assigned to the data source of node 406 using the Page Design Tool 102. The back-end at node 406 passes the data to node 408, which uses the data to determine whether the image should be green or red. For instance, if the data representing the credit score is above a certain threshold, the image displays green, signifying a good score. Otherwise, the image may display red.

Normally, in order to create such a dynamic image tied to the data source, much time and effort were needed to manually code the image and tie the conditional property to the correct data source. However, using the Page Design Tool 102 as disclosed herein, a user may simply drag the image onto the canvas and map data sources to conditional properties of the object.

c. Incorporating SVG Images into Page Design

Figure 5:
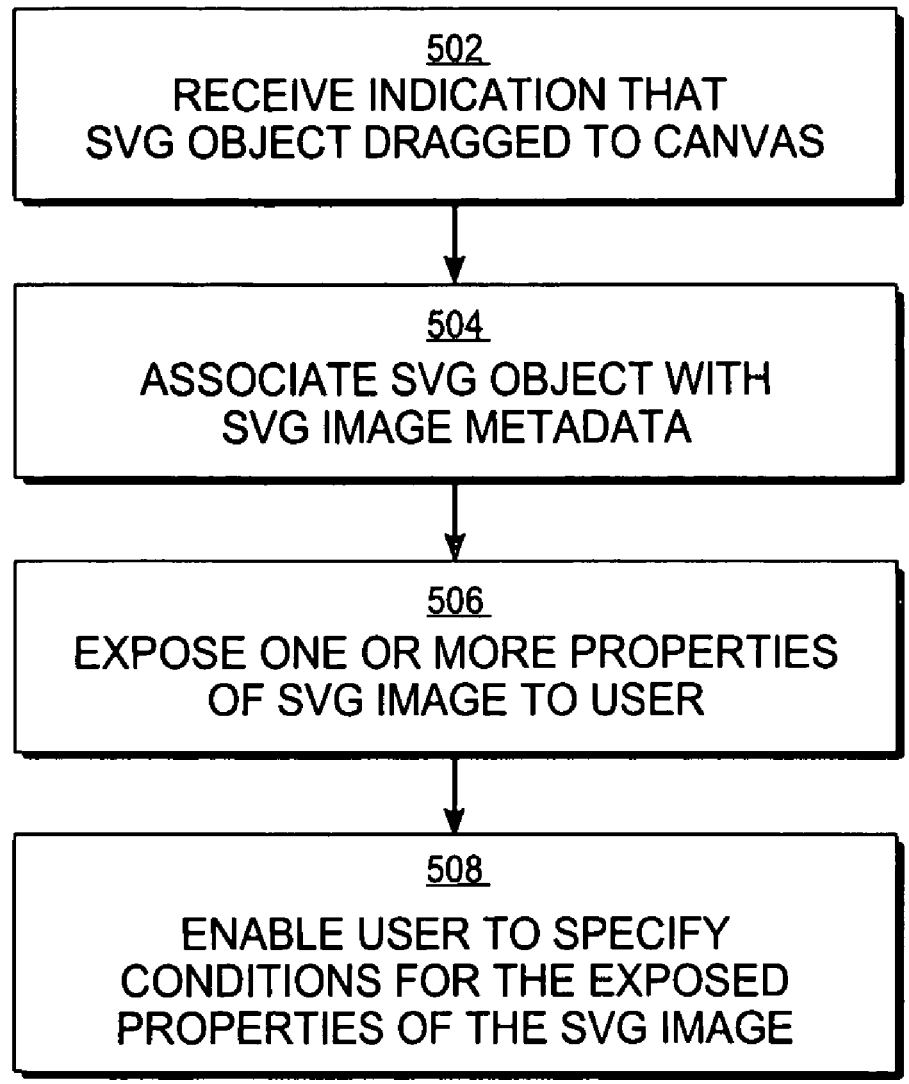
FIG. 5 is a flow diagram illustrating a method for enabling the use of an SVG image as a drag and drop object.

When a user would like to incorporate an SVG Image into a page of an application, such as the application described in FIG. 4, the user may create the page using the Page Design Tool 102. Referring now to FIG. 5, a flow diagram illustrating a method for enabling the use of an SVG image as a drag and drop object is shown in accordance with one embodiment. In order to place the SVG Image onto the page, a user may drag an SVG Object, representing the SVG Image onto the design canvas of the page design tool. Thus, at step 502, the Page Design Tool 102 receives an indication that the SVG Object has been dragged to the canvas.

Next, at step 504, the user associates SVG Metadata defining an SVG Image with the SVG Object. The SVG Metadata may be identified by selecting the appropriate file from the Project Library area of the Page Design Tool 102. Once the SVG Metadata is identified, the Page Design Tool 102 uses the SVG Object to parse through the SVG Metadata and identify properties or characteristics that the user has requested be exposed within the page design tool. For instance, as described above, the SVG Object may search for particular characters surrounding elements of the SVG Metadata that indicate the element should be exposed.

At step 506, the Page Design Tool 102 exposes the properties of the SVG Image that have been identified for exposure to the user. According to one embodiment, the Page Design Tool exposes the properties within the Properties area 206. When the property has been exposed, at step 508, the Page Design Tool 102 enables a user to specify conditions for the property of the SVG Image. For instance, referring back to FIG. 2, a user may specify conditions for the COLOR property of the SVG Image on Canvas 200 by accessing the Properties dialog box 206.

d. Associating Data Sources with SVG Image Properties

Figure 6A:
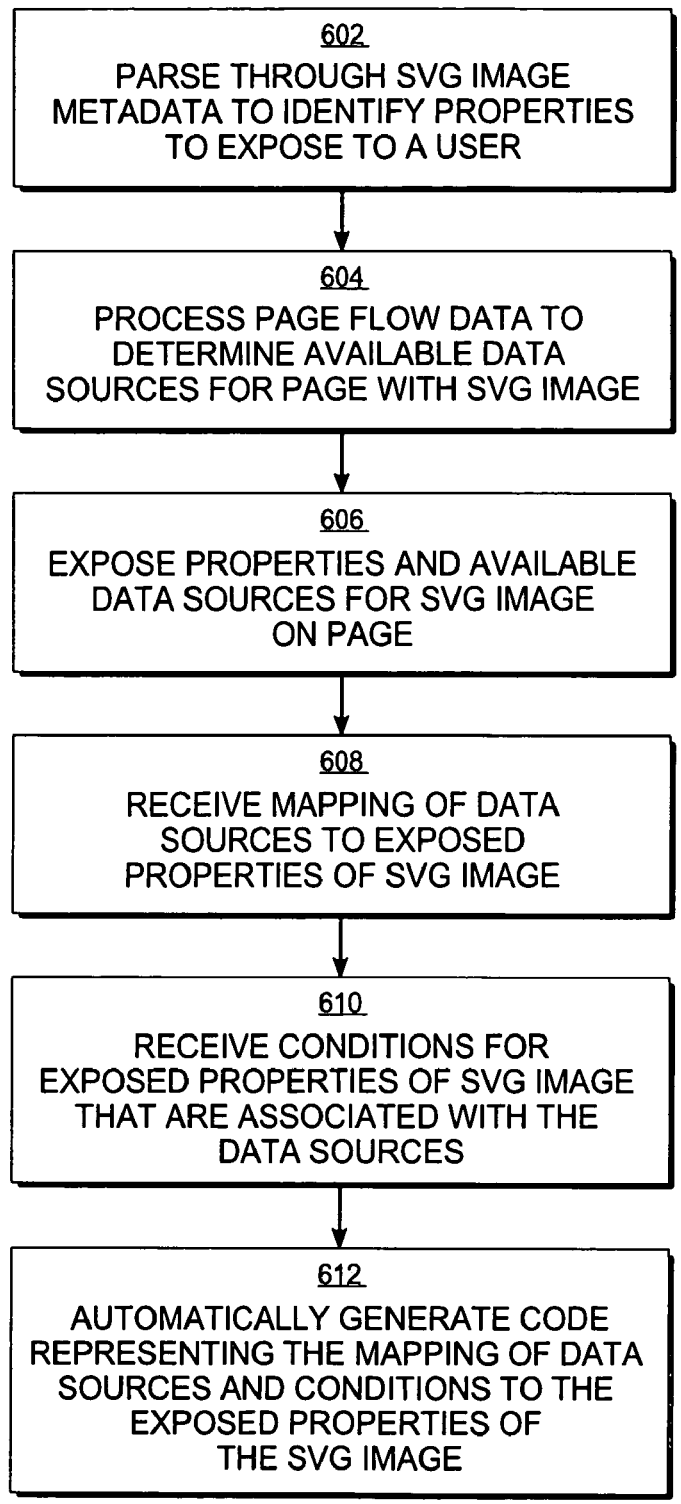
FIG. 6A is a flow diagram illustrating a process for associating data sources and conditions with properties of an SVG image according to one embodiment of the present invention.

Once the user has associated conditions with a particular property of an SVG Image, the user may assign available data sources to use to determine if those conditions have been satisfied. Referring now to FIG. 6A, a flow diagram illustrating a process for associating data sources and conditions with properties of an SVG image is shown according to one embodiment. At step 602, the Page Design Tool parses through the specified SVG Image Metadata to identify the properties to expose to the user as usual. However, at step 604, the Page Design Tool also interprets page flow data, which may have been previously created by the Page Flow Tool 106, in order to determine the available data sources to the particular page or node within the page flow. For example, referring back to FIG. 4, if the current page was Page C at node 408, the Page Design Tool would identify any data sources from node 406 as available data sources. Further, the Page Design Tool may identify additional data sources from previous pages, such as Page A and B at nodes 402 and 404. Alternatively, the Page Design Tool may identify other data sources such as databases that are not part of the page flow represented in FIG. 4.

Once the data sources have been identified, at step 606, the Page Design Tool 102 exposes both the selected properties of the SVG Image and the available data sources to the user. According to one embodiment, the properties and the data sources are both exposed within the Properties dialog box 206 of the Page Design Tool in FIG. 2. The data sources may be listed in conjunction with the properties to create a graphical "mapping" of the data sources to the exposed properties.

According to one embodiment, the Page Design Tool 102 presents a mapping within the properties dialog box for a user to manipulate. The user may drag the links representing the data sources into the properties dialog box, where the user may assign conditions for the data sources for the display or change of a particular property.

At step 608, the page design tool receives a mapping of the data sources to the exposed properties of SVG image data. For instance, a user may have dragged the links representing the data sources from the mapping tool to the properties dialog box for the particular SVG object.

Subsequently, at step 610, the user may assign conditions for the exposed properties. The conditions may be associated with the data sources such that when the Display Engine 108 prepares page for display to a user, the Display Engine 108 will determine if the conditions have been satisfied by querying data from the identified data sources. For instance, a user may request that a particular property conditionally displays two colors. In order to determine which color to display, the Display Engine 108 determines that it should examine a particular data source, and based on data retrieved from the data source, determine if the condition has been satisfied. Information identifying both the data source and the condition are supplied to the Display Engine 108 as part of page code that generated by the Page Design Tool 102.

Thus, at step 612, once the conditions have been assigned to properties of the SVG image, and once a mapping of data sources has been assigned to those properties, the Page Design Tool 102 automatically generates the code which represents the page containing the SVG image.

According to one embodiment, the code represents the mapping of data sources and conditions to the exposed properties of the SVG image. Because the code is automatically generated by the page design tool, no coding is required by the user, and the only interaction from the user is the selection and mapping of data sources to conditional properties. The user may assign any number of conditions to the properties without an extensive knowledge of web page design programming or back end systems.

e. Displaying Pages with Dynamic SVG Images

Once a user has completed using the Page Design Tool 102 to construct a page of a web application, the user may decide to design additional pages. Alternatively, if the user has completed designing pages for the web application, the web application, including the pages and the page flow data are provided to the Display Engine 108 for processing. The Display Engine 108 interacts with end-users who use the web-application. When an end-user performs a particular action on the web application, the Display Engine 108 reacts by determining which operations to conduct and which page to subsequently display to the end-user.

Figure 6B:
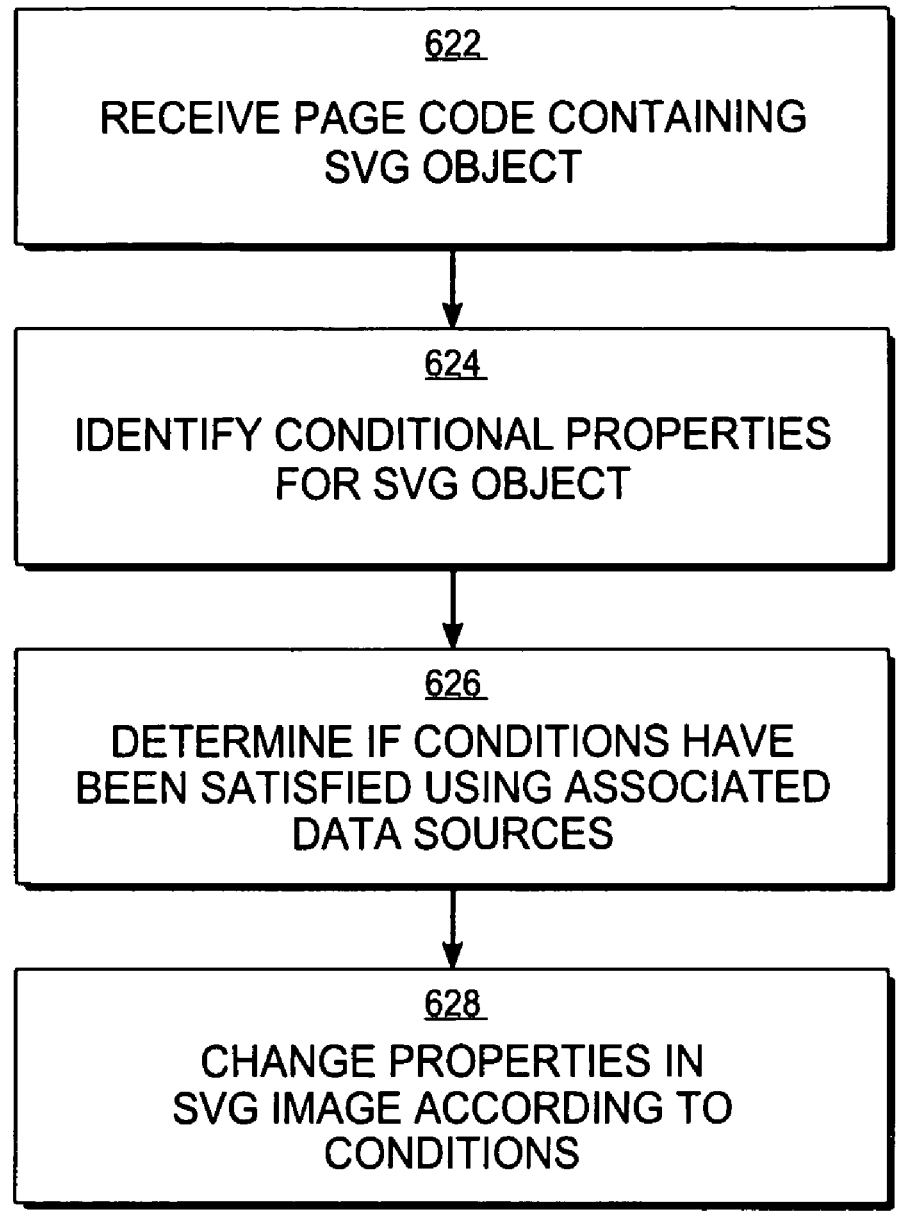
FIG. 6B is a flow diagram illustrating a process for displaying a dynamic SVG image according to one embodiment of the present invention.

Referring now to FIG. 6B, a flow diagram illustrating a process for displaying a dynamic SVG image is shown in accordance with one embodiment. At step 622, once the page design of the web application has been completed, the code representing both the pages and the page flow information of the web application is provided to the Display Engine 108.

Assume that an end-user requests to view a page containing an SVG image. The Display Engine 108 retrieves the code representing the requested page, which also contains the SVG Object code for the image. At step 624, the Display Engine 108 identifies conditions associated with the SVG object located on the requested page. For instance, the conditions may be in the form of conditional instructions processed by the Display Engine 108. Next, at step 626, the Display Engine 108 determines if any of the specified conditions have been satisfied by, for instance, examining data from data sources that have been identified within the page code. Recall that a user designing the page graphically assigns the data sources to the conditions. In response, the Page Design Tool 102 automatically generates code representing the relationship between the condition and the data source. Using this code, the Display Engine 108 identifies the page source and processes the appropriate data to determine if the condition has been satisfied.

If the condition has been satisfied, at step 628, the Display Engine 108 causes the properties of the SVG Image associated with the condition to change according to the instructions of the condition. For instance, if the condition specified that if the data source reported a value above a threshold that the color of the SVG image should be green, then when the Display Engine 108 determines that the value is above the threshold, the Display Engine 108 will cause the color of the SVG image to display green.

Changing SVG image properties may be accomplished in a number of different ways. For instance, according to one embodiment, SVG image metadata is embedded into the code of the particular page containing the SVG Object. To change a value of a property of the SVG Image, the Display Engine 108 merely changes the value within the SVG Image metadata located within the page code. This change may occur before displaying the page to a user. In another embodiment, the SVG Image may be displayed by directly accessing the source SVG metadata file, instead of any information in the page code itself. In such a case, the Display Engine 108 may change the value of the property within the source SVG metadata file, instead of the page code itself. In other embodiments, the Display Engine 108 may cause the property of the SVG image to change in any appropriate manner.

One useful example of the present invention includes the real-time presentation of graphical data representing one or more real world conditions. Suppose for example, that during an election, a user would like to present a graphical map that dynamically updates the color of map quadrants depending on election results.

Figure 7A:
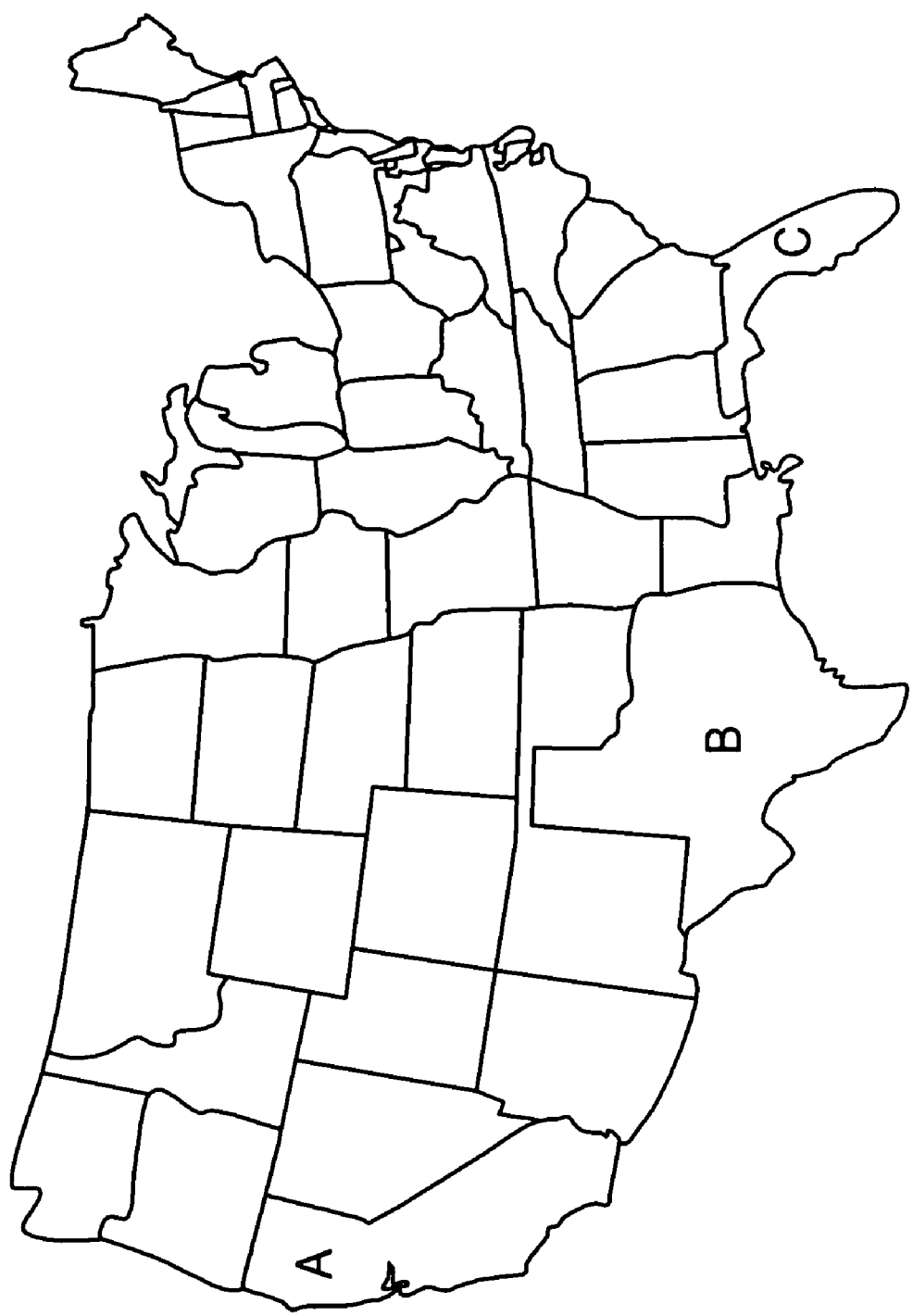
FIG. 7A is a, a diagram illustrating an SVG image is according to one embodiment of the present invention.

Referring now to FIG. 7A, a diagram illustrating an SVG image is shown according to one embodiment. The SVG image is map of the United States outlining the state boundaries. In this example, suppose that a user would like to track election results for three different states A, B and C representing California, Texas and Florida, respectively. As described above, the SVG image of FIG. 7A is represented by SVG metadata. The SVG metadata defines the boundaries and properties of SVG image as depicted in FIG. 7A. According to one embodiment, each state A, B and C is a separate object in an SVG metadata file.

Suppose that the user requested that the COLOR and PATTERN characteristics for these three objects be exposed during page design. According to one embodiment, a user wishing to assign conditions to the objects uses the Page Design Tool 102 to specify those conditions. For instance, assume that a user has specified conditions for each state A, B and C such that if the state election results are leaning towards a first party, the fill color of the state object should be black and if the results are leaning towards a different party, the pattern of the state object should be striped. Thus, for instance, referring to Metadata 300B in FIG. 3, a user may specify that the PATTERN and COLOR properties be exposed for the selected objects within the Page Design Tool 102

In the Page Design Tool 102, the user assigns the selected conditions to the selected properties and maps available data sources to the conditions. During display of the page, the Display Engine 108 examines data from the data source to assess whether the conditions have been satisfied. In this particular example, the data source may be a database containing continuously updated election results. According to one embodiment, the operation of querying the database for the election results is represented in the page flow as node 406 in FIG. 4.

Assume that an end-user wishes to view the election results for states A, B, and C. The Display Engine 108 determines that the page with the map of FIG. 7A should be displayed to the user. However, before displaying the page to the user, the Display Engine 108 examines the election results database to determine if conditions for the SVG Image embedded in the page have been satisfied. Referring now to FIG. 7B, a diagram illustrating a dynamically updated SVG Image is shown according to one embodiment. Note that, in comparison with FIG. 7A, the state regions A and C have now changed in respect to color and/or pattern. Thus, the Display Engine 108 has determined that, after examining the database, that one or more conditions have been satisfied for states A and C.

For instance, as described above, a user may have assigned the condition to state A that if election results favored one party to change the pattern of state A to display a striped pattern. Thus, during display of the SVG Image in FIG. 7B, state A appears to be striped, thus indicating to the user that the election results for state A favor a particular party. On the other hand, the color of state C has now changed, thus indicating that election results for state C are favoring a different party.

The above description of FIG. 7A and FIG. 7B provide only one example of how dynamic SVG Images may be used for display in a web application. In other embodiments, however, the SVG Images may be used in any manner, and the versatility of the Page Design Tool 102 and other components of System 100 allow for the simple incorporation of dynamic SVG and other metadata-defined images into display pages.

f. Tree and Tab as Drag and Drop Objects

Although the invention has been described in relation to SVG images and other metadata-defined images, the invention further encompasses the use of Tree and Tab components as drag and drop objects. According to one embodiment, Tree and Tab components are handled in a similar manner to SVG images except for the parsing and identification of metadata. Thus, Tree and Tab components, according to one embodiment, may not have associated metadata which defines properties or characteristics of the Tree and Tab components.

Tree components define a tree object on a web page. A Tree object is an object containing branch nodes and leaf nodes organized in a hierarchical manner. The branch nodes define a split within the tree and leaf nodes represent endpoints of the tree. Tree nodes are regularly used to define website hierarchies, file systems, and other similarly organized data. In the Page Design Tool 102, the Tree object is a component, much like the SVG Object, which may dragged onto the design canvas of the Page Design Tool 102 for easy incorporation into page design. Conventionally, Tree objects may be complex in that they are designed to expand and collapse in response to user-interaction. Hence, like SVG images, Tree objects normally require complex coding to respond to user-interaction.

Using the Tree object in the Page Design Tool 102, however, a user may simply drag and drop the Tree object on to the design canvas. When the Tree object is dragged to the canvas, a user may enter static information regarding the nodes of the tree, or alternatively, decide that particular nodes of the tree should be dynamic. If the user wishes to assign dynamic properties to a node of the tree, the user may assign conditions to the tree node, as well map data sources to the node in a graphical manner. According to one embodiment, a Tree object may also expose tree properties which may be manipulated by the user. For instance, much like the SVG Object, a user may define conditions for Tree properties and assign data sources for analyzing those conditions.

Further, another object for use in the Page Design Tool 102 is a Tab Object. A Tab Object tab objects used to display tabs on a page. Tabs are used to assist end-users in navigating page content. Conventionally, Tab objects are displayed as a tab based navigation pane containing tabs and page content. In a tab based navigation pane, each tab is associated with separate tab-page content. A user navigates the page content by examining the tab labels. When a user clicks on the tab, the content associated with that tab is displayed to the user. Using the Page Design Tool 102, properties of the Tab object may be exposed. Such properties may be the number of tabs to display and the text labels of each tab. Further, according to one embodiment, the properties of the tab object may be dynamically updated depending on the satisfaction of one or more conditions. Hence, much like an SVG Object, data sources may be mapped to the Tab object for use in determining whether a condition has been satisfied.

Thus, as is the case with SVG images, the Page Design Tool 102 allows for the simple incorporation of Tree and Tab components into web application page design. Further, in other embodiments, the Page Design Tool 102, in conjunction with the other components of System 100, may provide the ability to incorporate other types of complex objects into page design using simple drag and drop techniques.

Hardware Overview

Figure 8:
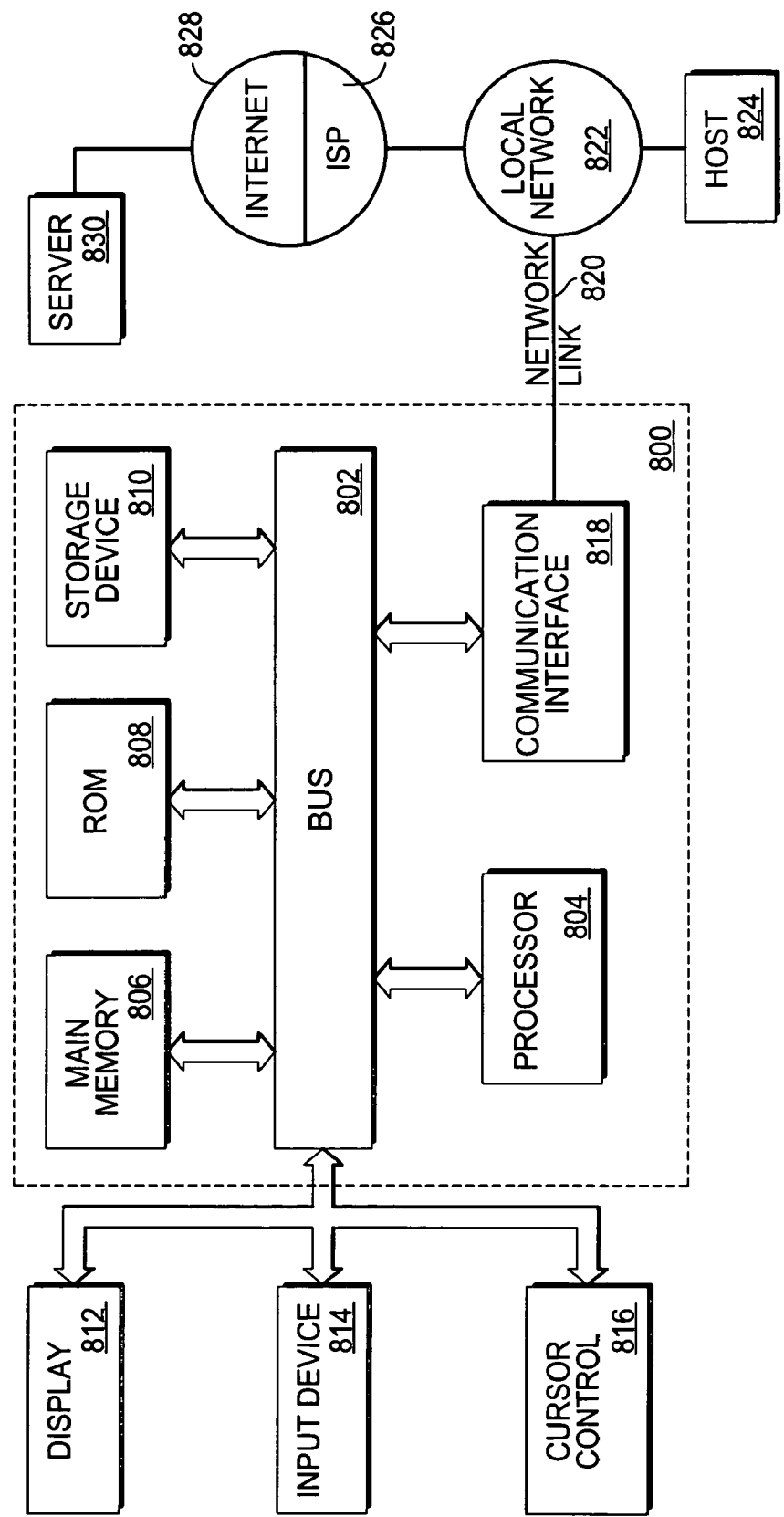
FIG. 8 is a block diagram of a general purpose computer system in which one embodiment of the present invention may be implemented.

FIG. 8 is a block diagram that illustrates a computer system 800 upon which an embodiment of the invention may be implemented. Computer system 800 includes a bus 802 for facilitating information exchange, and one or more processors 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 may further include a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812 for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In computer system 800, bus 802 may be any mechanism and/or medium that enables information, signals, data, etc., to be exchanged between the various components. For example, bus 802 may be a set of conductors that carries electrical signals. Bus 802 may also be a wireless medium (e.g. air) that carries wireless signals between one or more of the components. Bus 802 may further be a network connection that connects one or more of the components. Any mechanism and/or medium that enables information, signals, data, etc., to be exchanged between the various components may be used as bus 802.

Bus 802 may also be a combination of these mechanisms/media. For example, processor 804 may communicate with storage device 810 wirelessly. In such a case, the bus 802, from the standpoint of processor 804 and storage device 810, would be a wireless medium, such as air. Further, processor 804 may communicate with ROM 808 capacitively. Further, processor 804 may communicate with main memory 806 via a network connection. In this case, the bus 802 would be the network connection. Further, processor 804 may communicate with display 812 via a set of conductors. In this instance, the bus 802 would be the set of conductors. Thus, depending upon how the various components communicate with each other, bus 802 may take on different forms. Bus 802, as shown in FIG. 8, functionally represents all of the mechanisms and/or media that enable information, signals, data, etc., to be exchanged between the various components.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 800, various machine-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of a machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, an EPROM, a FLASH-EPROM, any other memory chip or cartridge, or any other non-transitory medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   receiving an indication that a user is placing an image on a design canvas using a graphical user interface;
   receiving, from the user, a selection of Scalable Vector Graphics (SVG) image metadata, wherein the SVG image metadata is configured to define a particular property for the image;
   associating the image with the SVG image metadata to obtain a metadata-defined image;
   presenting the user with a definition for the particular property of the metadata-defined image;
   receiving input from a user specifying one or more conditions for the particular property; and
   modifying the SVG image metadata for the metadata-defined image to include the one or more conditions, wherein the one or more conditions are applied to adjust a value for the property during display of the metadata-defined image.

2. A machine-implemented method as in claim 1, further comprising:
   automatically generating a set of instructions representing the one or more conditions for the particular property; and
   wherein applying the one or more conditions to adjust a value for the property during display of the metadata-defined image includes executing the set of instructions.

3. A machine-implemented method as in claim 1, further comprises:
   exposing at least one available data source to the user;
   enabling the user to associate the data source with the one or more conditions for the particular property; and
   wherein applying the one or more conditions to adjust a value for the property during display of the metadata-defined image includes determining that the one or more conditions have been satisfied by inspecting data from the data source.

4. A machine-implemented method as in claim 3, wherein exposing the data source further comprises:
   inspecting page flow data representing the organization of one or more pages within an application;
   extracting at least one data source available for the current page within the application; and
   displaying a graphical representation of the data source on a graphical user interface for the user.

5. A machine-implemented method as in claim 1, further comprising:
   determining that the one or more conditions have been satisfied, and in response, causing the particular property of the metadata-defined image to change during display of the metadata-defined image.

6. A machine-implemented method as in claim 5, wherein determining that the one or more conditions have been satisfied includes processing data from one or more data sources associated with the one or more conditions, wherein the user associates the one or more data sources with the one or more conditions for the particular property.

7. A machine-implemented method as recited in claim 1, wherein the metadata-defined image is an SVG image and the metadata is in the form of Extensible Markup Language (XML).

8. A machine-readable storage medium comprising one or more sets of instruction which, when executed by one or more processors, cases the one or more processors to perform the following operations:
   receiving an indication that a user is placing an image on a design canvas using a graphical user interface;
   receiving, from the user, a selection of Scalable Vector Graphics (SVG) image metadata, wherein the SVG image metadata is configured to define a particular property for the image;
   associating the image with the SVG image metadata to obtain a metadata-defined image;
   presenting the user with a definition for the particular property of the metadata-defined image;
   receiving input from a user specifying one or more conditions for the particular property; and
   modifying the SVG image metadata for the metadata-defined image to include the one or more conditions, wherein the one or more conditions are applied to adjust a value for the property during display of the metadata-defined image.

9. A machine-readable storage medium as in claim 8, further comprising:
   automatically generating a set of instructions representing the one or more conditions for the particular property; and
   wherein applying the one or more conditions to adjust a value for the property during display of the metadata-defined image includes executing the set of instructions.

10. A machine-readable storage medium as in claim 8, further comprising instructions for:
    exposing at least one available data source to the user;
    enabling the user to associate the data source with the one or more conditions for the particular property; and
    wherein applying the one or more conditions to adjust a value for the property during display of the metadata-defined image includes determining that the one or more conditions have been satisfied by inspecting data from the data source.

11. A machine-readable storage medium as in claim 10, wherein exposing the data source further comprises:
    inspecting page flow data representing the organization of one or more pages within an application;
    extracting at least one data source available for the current page within the application; and
    displaying a graphical representation of the data source on a graphical user interface for the user.

12. A machine-readable storage medium as recited in claim 8, further comprising instructions for determining that the one or more conditions have been satisfied, and in response, causing the particular property of the metadata-defined image to change during display of the metadata-defined image to change during display of the metadata-defined image.

13. A machine-readable storage medium as recited in claim 12, wherein determining that the one or more conditions have been satisfied include processing data from one or more data sources associated with the one or more conditions, wherein the user associates the one or more data sources with the one or more conditions for the particular property.

14. A machine-readable storage medium as recited in claim 8, wherein the metadata-defined image is an SVG image and the metadata is in the form of Extensible Markup Language (XML).

15. An apparatus, comprising:
a persistent storage;
one or more processors; and
a set of instructions, which when executed by the one or more processors, causes the one or more processors to perform the following operations:
  receiving an indication that a user is placing an image on a design canvas using a graphical user interface;
  receiving, from the user, a selection of Scalable Vector Graphics (SVG) image metadata, wherein the SVG image metadata is configured to define a particular property for the image;
  associating the image with the SVG image metadata to obtain a metadata-defined image;
  presenting the user with a definition for the particular property of the metadata-defined image;
  receiving input from a user specifying one or more conditions for the particular property; and
  modifying the SVG image metadata for the metadata-defined image to include the one or more conditions, wherein the one or more conditions are applied to adjust a value for the property during display of the metadata-defined image.

16. An apparatus as in claim 15, further comprising:
automatically generating a set of instructions representing the one or more conditions for the particular property; and
wherein applying the one or more conditions to adjust a value for the property during display of the metadata-defined image includes executing the set of instructions.

17. An apparatus, as in claim 15, further comprising:
exposing at least one available data source to the user;
enabling the user to associate the data source with the one or more conditions for the particular property; and
wherein applying the one or more conditions to adjust a value for the property during display of the metadata-defined image includes determining that the one or more conditions have been satisfied by inspecting data from the data source.

18. An apparatus as in claim 17, wherein exposing the data source further comprises:
inspecting page flow data representing the organization of one or more pages within an application;
extracting at least one data source available for the current page within the application; and
displaying a graphical representation of the data source on a graphical user interface for the user.

19. An apparatus as recited in claim 15, further comprising determining that the one or more conditions have been satisfied, and in response, causing the particular property of the metadata-defined image to change during display of the metadata-defined image to change during display of the metadata-defined image.

20. An apparatus as recited in claim 19, wherein determining that the one or more conditions have been satisfied include processing data from one or more data sources associated with the one or more conditions, wherein the user associates the one or more data sources with the one or more conditions for the particular property.

21. An apparatus as recited in claim 15, wherein the metadata-defined image is an SVG image and the metadata is in the form of Extensible Markup Language (XML).

* * * * *